(12) United States Patent
Manthiramoorthy et al.

(10) Patent No.: US 9,870,219 B1
(45) Date of Patent: Jan. 16, 2018

(54) MECHANISMS FOR PERFORMING SWITCH UPGRADES USING REMOTE CONTAINERS

(71) Applicant: Cisco Technology, Inc., San Jose, CA (US)

(72) Inventors: Natarajan Manthiramoorthy, San Jose, CA (US); Venkatesh Srinivasan, San Jose, CA (US); Swaminathan Narayanan, San Jose, CA (US); Anand Kumar Singh, San Jose, CA (US); Ambrish Niranjan Mehta, San Jose, CA (US); Anulekha Chodey, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 30 days.

(21) Appl. No.: 15/203,583

(22) Filed: Jul. 6, 2016

(51) Int. Cl.
| | |
|---|---|
| G06F 9/44 | (2006.01) |
| G06F 9/445 | (2006.01) |
| H04L 29/12 | (2006.01) |
| H04L 29/08 | (2006.01) |
| G06F 17/30 | (2006.01) |

(52) U.S. Cl.
CPC .......... G06F 8/65 (2013.01); G06F 17/30088 (2013.01); H04L 61/1511 (2013.01); H04L 67/34 (2013.01); H04L 61/6004 (2013.01)

(58) Field of Classification Search
None
See application file for complete search history.

(56) References Cited

U.S. PATENT DOCUMENTS

| | | | |
|---|---|---|---|
| 7,383,405 B2 | 6/2008 | Vega et al. | |
| 8,191,063 B2 | 5/2012 | Shingai et al. | |
| 8,200,634 B2 | 6/2012 | Driesen et al. | |
| 8,200,787 B2 | 6/2012 | Schulz et al. | |
| 2013/0290945 A1* | 10/2013 | Sawal | G06F 8/67 717/168 |
| 2014/0304698 A1* | 10/2014 | Chigurapati | G06F 8/65 717/171 |
| 2016/0261460 A1* | 9/2016 | Shi | H04L 41/082 |

(Continued)

FOREIGN PATENT DOCUMENTS

WO 2015126292 A1 8/2015

*Primary Examiner* — Wei Zhen
*Assistant Examiner* — Binh Luu
(74) *Attorney, Agent, or Firm* — Polsinelli PC

(57) ABSTRACT

Mechanisms for switch upgrades using remote containers. An example system can export, to a server, a state of software processes associated with a first software container at the system. The system can generate a lightweight software container configured to forward traffic associated with the first software container to a second software container at the server, generated based on the state. The system can perform a switchover between the first software container and lightweight software container. The switchover can enable the lightweight software container to forward, to the second container, traffic associated with the first software container. The system can generate a fourth software container based on a snapshot of the second software container, and perform another switchover between the lightweight software container and fourth software container. The switchover can include enabling the fourth software container to handle traffic associated with the first software container, and disabling the lightweight software container.

19 Claims, 6 Drawing Sheets

(56) References Cited

U.S. PATENT DOCUMENTS

2016/0342510 A1* 11/2016 Pani .................... G06F 12/0615
2016/0364231 A1* 12/2016 Tati ........................... G06F 8/67
2017/0090897 A1* 3/2017 Veereshwara ............. G06F 8/65

* cited by examiner

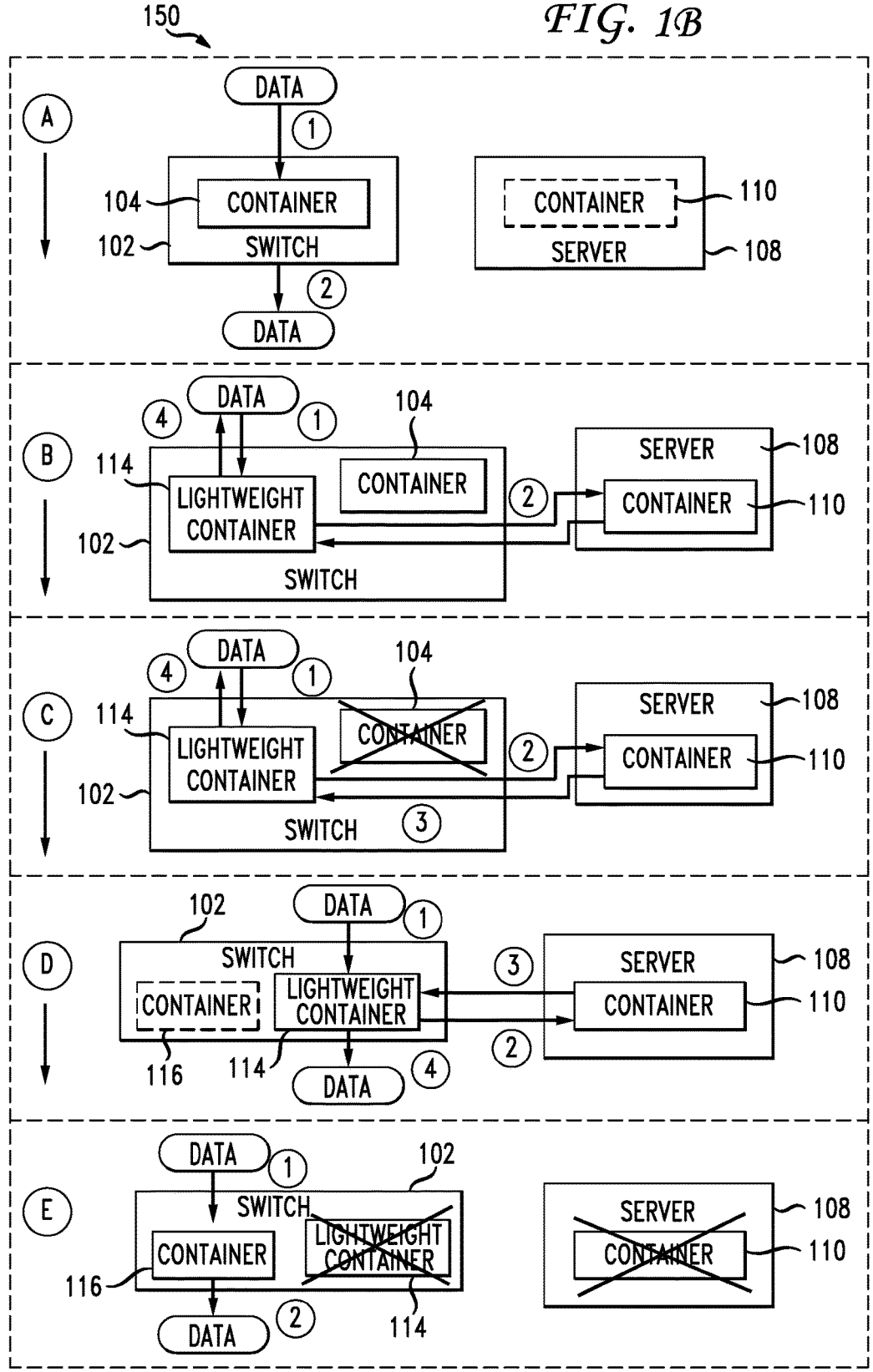

MECHANISMS FOR PERFORMING SWITCH UPGRADES USING REMOTE CONTAINERS

TECHNICAL FIELD

The present technology pertains to upgrading network switches, and more specifically to upgrading network switches using remote containers.

BACKGROUND

Various solutions have been developed to limit the amount of downtime experienced when updating or upgrading network devices in a network. For example, An ISSU (in-service software upgrade) is a solution for updating software on a network device without taking the network device offline and thereby disrupting network services and connectivity. Generally, ISSU requires a network device with redundant supervisor engines. On modular switches, this allows one engine to operate while the system software on the other engine is updated or upgraded. On non-modular switches (for example Top-of-the-Rack), similar ISSU can be done with spawning a new container on local switch and following similar approach as modular switches. While these solutions limit the amount of disruption or downtime experienced when updating or upgrading a network device, they also increase the minimum memory requirements on the platform. The increased memory requirements may result in increased costs and operational requirements. Moreover, in some cases, legacy platforms already deployed may not have adequate memory capabilities to support even the minimum memory requirements to spawn another container for ISSU.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1B illustrates a schematic diagram of data communications during a switch upgrade process;

DESCRIPTION OF EXAMPLE EMBODIMENTS

Figure 1A:
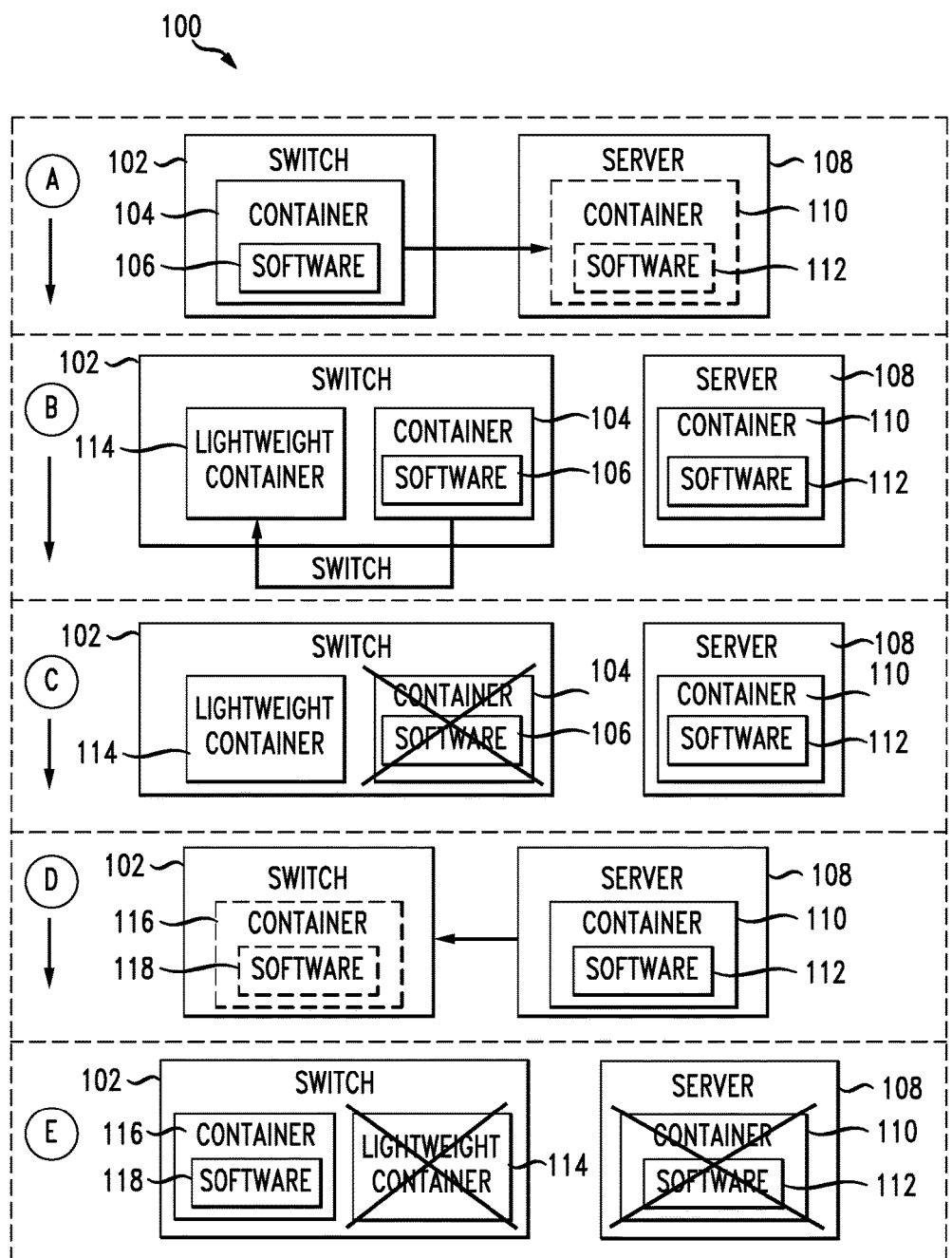
FIG. 1A illustrates a schematic diagram of an example system for performing switch upgrades.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to reduce the memory footprint requirement for supporting network device upgrades with limited or zero downtime or disruptions. For example, the approaches set forth herein can be used to reduce the memory requirements for performing in-service software upgrades (ISSU), including single supervisor hitless ISSU. Moreover, the approaches set forth herein can be used for upgrading network devices in container-based designs.

For example, to upgrade a network device, the system software of the network device can be re-designed to run inside a container on the device. An upgraded version of container can then be momentarily generated at a server configured to host the container during the upgrade process. A lightweight container can be maintained at the device to manage control plane traffic during the upgrade. The upgraded container can then replace the old container at the device, so the device does not have to maintain both containers simultaneously. By eliminating the need to host multiple full-blown containers at a time, the approaches herein can significantly reduce the memory requirements for ISSU and similar upgrades.

Disclosed are systems, methods, and computer-readable storage media for performing single supervisor switch upgrades using remote containers. In some examples, a system can be configured to run the system software inside of a first software container at the system. The system can verify reachability to a remote server identified for hosting the first software container during an update event, such as a system upgrade. The system can then export a state of software processes associated with the first software container to the remote server. The state can be exported to the remote server for import into a second software container at the remote server. The second software container can be generated based on the state and the first software container. For example, the second software container can be an updated/upgraded version of the first software container generated based on the first software container, the state, and one or more updated software applications or images.

The system can generate a third software container configured to forward traffic (e.g., control traffic) associated with the first software container to the second software container. The third software container can be a lightweight container. The lightweight container can have a lower memory footprint than the first software container. The system can then perform a first switchover operation between the first software container and the third software container. The first switchover operation can enable the third software container to forward, to the second container on the remote server, traffic (e.g., control traffic) associated with the first software container.

The system can also generate a fourth software container based on a snapshot of the second software container on the remote server. The fourth software container can include the state of the second software container as well as the software applications and drivers from the second software container, for example. The fourth software container can include all the updates or upgrades selected or identified for updating/upgrading the first software container.

The system can generate the fourth software container on the local system (e.g., hosted on local memory or drive associated with the system). In some examples, the system can generate the fourth software container on a separate system or device and subsequently move the fourth software container to the system to run on the system.

Once the fourth software container is on the system, the system can perform a second switchover operation between the third software container and the fourth software container. The second switchover operation can include enabling the fourth software container to handle traffic associated with the first software container, and/or disabling the third software container on the network device and second software container on the server. The system can then use the fourth software container as the active container on the system. The fourth software container can include the system software for operating the system.

Description

The disclosure addresses the need in the art for reducing the memory footprint of switch upgrade procedures. Disclosed are systems, method, and computer-readable media for performing single supervisor switch upgrades using remote containers. As follows, the disclosure starts with a discussion of example architectures and configurations for switch upgrade procedures. Example methods and strategies for performing switch upgrades with then follow. The disclosure then concludes with a description of example systems and devices for performing switch upgrades. The disclosure now turns to FIG. 1.

FIG. 1A illustrates a schematic diagram of an example system 100 for performing switch upgrades. Switch 102 can be configured to run the system software 106, such as the operating system (OS), drivers, and applications, in a container 104. The container 104 can include or host one or more services, applications, drivers, libraries, environments, etc. As one of ordinary skill in the art will recognize, the container 104 can be a virtualized environment for deploying services and/or applications at the switch 102. For example, switch 102 can include a container virtualization layer for hosting or deploying one or more services, applications, and/or software drivers. This container virtualization layer, including software 106, can make up the container 104.

Server 108 can be a separate device which can be used to assist in the upgrade by hosting a copy of the container 104 during the upgrade process. In particular, server 108 can host container 110 during the upgrade process. Container 110 can be a copy of container 104. Moreover, container 110 can include the upgraded software 112, which can include the upgraded system image, operating system, applications, libraries, and/or drivers. The software 112 can be based on the new target or upgrade image, which can include any new software or elements to which we are upgrading.

Container 110 and/or software 112 can be upgraded as they are generated on server 108 or after being generated on server 108. For example, container 110 and software 112 can be generated based on the updated version of the software to be upgraded, or generated based on container 104 and software 106 and thereafter upgraded based on the updated version of the software to be upgraded. Container 110 and software 112 can also include any other modifications to container 104 and 106, such as new or modified settings, new or modified applications or software, new or modified files, etc.

Switch 102 can export the state information associated with the applications and/or processes in container 104 to server 108. Server 108 can receive the state information and import it into container 110. Accordingly, container 110 and software 112 can be deployed with the state information to reflect the current state on switch 102.

The network name and/or domain naming system (DNS) of the server 108 can be configured on the switch 102 to ensure network connectivity to and from the container 110. Moreover, prior to exporting the state information, switch 102 can probe the server 108 to verify reachability. Server 108 can have a configurable network address (e.g., IP address). Switch 102 can also define the network address for switch 102 and/or container 110. For example, switch 102 can test all of its own network addresses to identify which network address receives a successful probe response. The network address that receives the successful probe response can be set as the network address for the probes, switch 102, and/or container 110.

Once the container 110 has been generated on the server 108, a lightweight container 114 can be generated at the switch 102. The lightweight container 114 can perform hardware read and write operations at switch 102, and can include the user space drivers of switch 102 to manage the hardware of switch 102. The lightweight container 114 can also include a module to perform encapsulation and decapsulation of control plane traffic from switch 102 to server 108. This way, the lightweight container 114 can continue to handle traffic (e.g., control traffic) directed to container 104 during the upgrade process, by tunneling the traffic from switch 102 to server 108 to be processed by container 110.

The lightweight container 114 does not need to have all of the OS applications running and, therefore, should have minimal memory requirements compared to container 104. The reduced memory requirements of the lightweight container 114 can allow the upgrade process to be performed using significantly less memory on the switch 102 than would normally be required when performing an in-service software upgrade (IS SU).

Once the lightweight container 114 has been generated, the switch 102 can perform a switchover operation. The switchover operation changes control from container 104 to the lightweight container 114. The switchover operation can thus activate or enable the lightweight container 114, which can begin to tunnel control plane traffic from switch 102 to container 110 on server 108.

The switch 102 can then destroy, delete, and/or remove the container 104. The switch 102 can also generate container 116 with software 118 on switch 102. The container 116 can be generated based on a snapshot of container 110 and software 112 on server 108. The snapshot can include the state information at container 110. The container 116 and software 118 includes any updates, upgrades, and/or modifications made to container 104 and software 102.

Once the container 116 is operational, the switch 102 can perform another switchover operation to enable or activate container 116 and disable or deactivate lightweight container 114. After the switchover operation, container 116 can continue to handle and process traffic to the switch 102. Moreover, the traffic is no longer tunneled to, or processed by, container 110. Thus, the container 110 can be removed from server 108 and/or destroyed. The lightweight container 114 can also be destroyed, deleted, and/or removed from the switch 102.

The switch 102 can perform a line card container upgrade to update any line card settings for the upgraded container 116 and software 118.

FIG. 1B illustrates a schematic diagram 150 of data communications during a switch upgrade process. At stage A, container 104 can handle incoming communications (1) directed at container 104, as well as outgoing communications (2). The incoming communications can include packets, such as control packets.

At stage B, once the container 110 has been generated at server 108 and lightweight container 114 is operational at switch 102, the lightweight container 114 can receive incoming communications (1) and tunnel the communications (2) to container 110, which can then process the communications, and return the communications (3) to the lightweight container 114. The lightweight container 114 can receive the communications (3) from the container 110 and transmit the communications (4) as necessary.

At stage C, throughout the destruction of container 104 on switch 102, the lightweight container 114 can continue to receive the incoming communications (1) and tunnel the communications (2) to container 110, which can process the communications, and return the communications (3) to the lightweight container 114. The lightweight container 114 can receive the communications (3) from the container 110 and transmit the communications (4) as necessary.

At stage D, while the container 116 is spawned at switch 102, the lightweight container 114 can continue to receive incoming communications (1), transmit the communications (2) to the container 110 on the server, receive the processed communications (3) from the container 110, and transmit the communications (4) out as necessary.

At stage E, once the container 116 is enabled or activated on the switch 102, the container 116 can start receiving incoming communications (1) and processing the communications (2). The lightweight container 114 on the switch 102 and container 110 on the server 108 can be destroyed, removed, and/or disabled.

As illustrated, switch 102 and server 108 can work together at stages A-E to continue to handle communications associated with container 104 during the upgrade process. This can reduce or eliminate the disruption or downtime experienced by switch 102 during the upgrade process.

Figure 2:
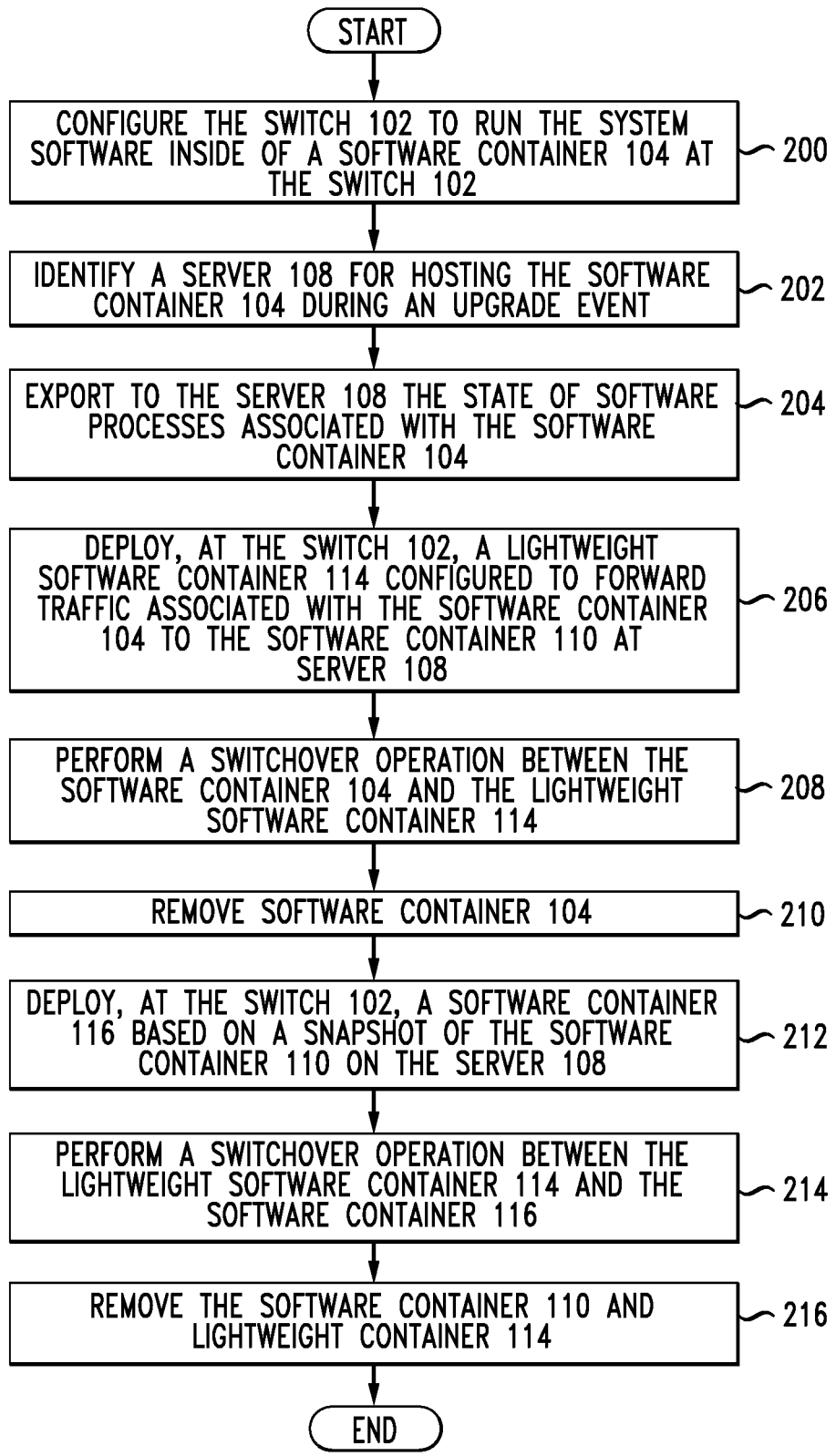
FIG. 2 illustrates an example method for performing a switch update.

Having disclosed some basic system components and concepts, the disclosure now turns to the exemplary method embodiment shown in FIG. 2. For the sake of clarity, the method is described in terms of a switch 102 and server 108, as shown in FIGS. 1A-B, configured to practice the various steps of the method. The steps outlined herein are exemplary and can be implemented in any combination thereof, including combinations that exclude, add, or modify certain steps.

At step 200, the switch 102 can be configured to run the system software inside of a software container 104 at the switch 102. The system software can include the OS, device drivers, applications, etc. At step 202, a server 108 can be identified for hosting the software container 104 during an update event. The update event can be an update or upgrade of the content in the container 104 (e.g., system software, applications, etc.), a modification of the content in the container 104 (e.g., adding, modifying, removing software, etc.), a re-install of software and applications, etc.

Once the server 108 has been identified, the switch 102 can send probes to verify reachability prior to performing the update process. The switch 102 can ping or probe various network addresses (e.g., IPs) to determine reachability of the server 108, including any network addresses at the switch 102. The DNS information and/or network name of server 108 can also be configured on the switch 102 to enable communications during the update process. The switch 102 can thus establish a communication channel with the server 108 for use during the update process.

At step 204, the switch 102 can export to the server 108 the state of software processes associated with the software container 104. The state can be exported for import into software container 110 at server 108. As previously mentioned, software container 110 can be deployed on server 108 as part of the update process. In particular, software container 110 can be generated on server 108 based on the software container 104. For example, software container 110 can be a copy or export of software container 104. In some example, software container 110 can be an updated/upgraded version of software container 104. For example, software container 110 can be generated based on software container 104, but using an upgraded or updated image of the software 106 associated with software container 104. In addition, the state exported from container 104 can be imported or incorporated into software container 110. Accordingly, when software container 110 is launched or deployed, it can start with the current state of the software, processes, and applications of software container 104.

At step 206, the switch 102 can deploy a lightweight software container 114 configured to forward traffic associated with the software container 104 to the software container 110 at server 108. The lightweight container 114 can include software and drivers to allow hardware read and write and manage the hardware of the switch 102. Moreover, the lightweight container 114 can include one or more modules configured to perform encapsulation and decapsulation of control plane traffic from the switch 102 to the container 110 at the server 108. The lightweight container 114 does not have to run or include all of the software applications from software container 104, and thus can have a lower memory footprint than the software container 104. In some cases, the lightweight container 114 can require significantly less memory than the software container 104 being upgraded/updated.

At step 208, the switch 102 can perform a switchover operation between the software container 104 and the lightweight software container 114. The switchover operation can enable the lightweight software container 114 to forward traffic associated with the software container 104 to the software container 110 at server 108. Thus, during the update process, traffic directed to container 104 can be tunneled by the lightweight software container 114 to the software container 110 at server 108. The software container 114 can then process the traffic intended for container 104 as would otherwise have been processed by container 104, in order to reduce or eliminate any disruptions of service during the update process.

At step 210, the switch 102 can remove the software container 104. This can free up memory or space on the switch 102 for storing the new, upgraded software container.

At step 212, the switch 102 can deploy software container 116 based on a snapshot of the software container 110 on the server 108. The software container 116 can be a copy of the software container 110 at server 108. Moreover, the software container 116 can include the state of software container 110, as well as software 112. When deployed, the software container 116 can include any updates, upgrades, and/or modifications made to software container 104 as part of the update process.

At step 214, the switch 102 can perform a switchover operation between the lightweight software container 114 and the software container 116. The switchover operation include enabling the software container 116 to handle traffic associated with the software container 104 and/or disabling the lightweight software container 114 on the switch 102. Thus, when software container 116 is ready to become operational, it can be set to take over any operations performed by the lightweight container 114 and the software container 110 during the update process.

At step 216, the method can include removing (e.g., destroying, disabling, deleting, etc.) the software container 110 on the server 108 and the lightweight container 114 on the switch 102.

In some cases, after steps 214 and/or 216, the switch 102 can perform other tweaks or updates, such as line card updates, to finalize the installation. The software container 116 can then fully replace the software container 104 as the updated, upgraded, or modified version of the software container 104.

The update process of method 200 can also be performed for migrating and/or replacing software and containers. Moreover, while the method 200 is described herein with reference to a switch, other devices are contemplated herein, such as routers, bridges, servers, single supervisor engine devices, dual supervisor engine devices, etc.

Figure 3:
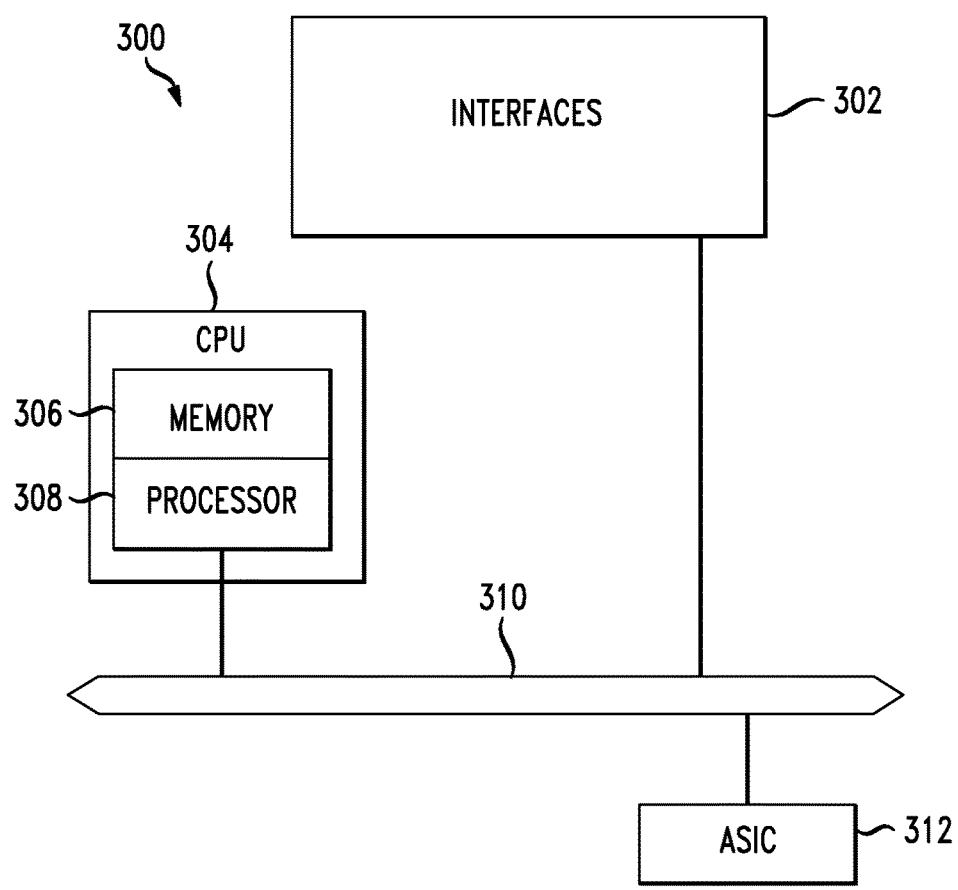
FIG. 3 illustrates an example network device.

The disclosure now turns to FIGS. 3 and 4, which illustrate example network and system devices.

FIG. 3 illustrates an example network device 300 suitable for high availability and failover. Network device 300 can include a master central processing unit (CPU) 304, interfaces 302, and a bus 310 (e.g., a PCI bus). When acting under the control of appropriate software or firmware, the CPU 304 can be responsible for executing packet management, error detection, and/or routing functions. The CPU 304 can accomplish all these functions under the control of software including an operating system and any appropriate applications software. CPU 304 may include one or more processors 308, such as a processor from the Motorola family of microprocessors or the MIPS family of microprocessors. In an alternative configuration, processor 308 is specially designed hardware for controlling the operations of the network device 300. In some cases, a memory 306 (such as non-volatile RAM, ROM, TCAM, etc.) can also form part of CPU 304. However, there are many different ways in which memory could be coupled to the network device 300.

The interfaces 302 can be provided as interface cards (sometimes referred to as "line cards").

Generally, the interfaces 302 can control the sending and receiving of packets over the network, and support other peripherals used with the network device 300. Among the interfaces that may be provided are Ethernet interfaces, frame relay interfaces, cable interfaces, DSL interfaces, token ring interfaces, Layer 1 interfaces, fiber optic interfaces, and so forth. In addition, various very high-speed interfaces may be provided such as fast token ring interfaces, wireless interfaces, Ethernet interfaces, Gigabit Ethernet interfaces (e.g., 10, 25, 40, 50, 100 GbE, etc.), ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 304 to efficiently perform routing computations, network diagnostics, security functions, etc.

The network device 300 can also include an application specific integrated circuit or ASIC 312. The ASIC 312 can communicate with other components in the network device 300 (e.g., interfaces 302, CPU 304, memory 306, processor 308, etc.) via the bus 310. The ASIC 312 can be an integrated circuit customized for a particular use, such as routing operations, including forwarding operations.

Although the system shown in FIG. 3 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 306) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 4A:
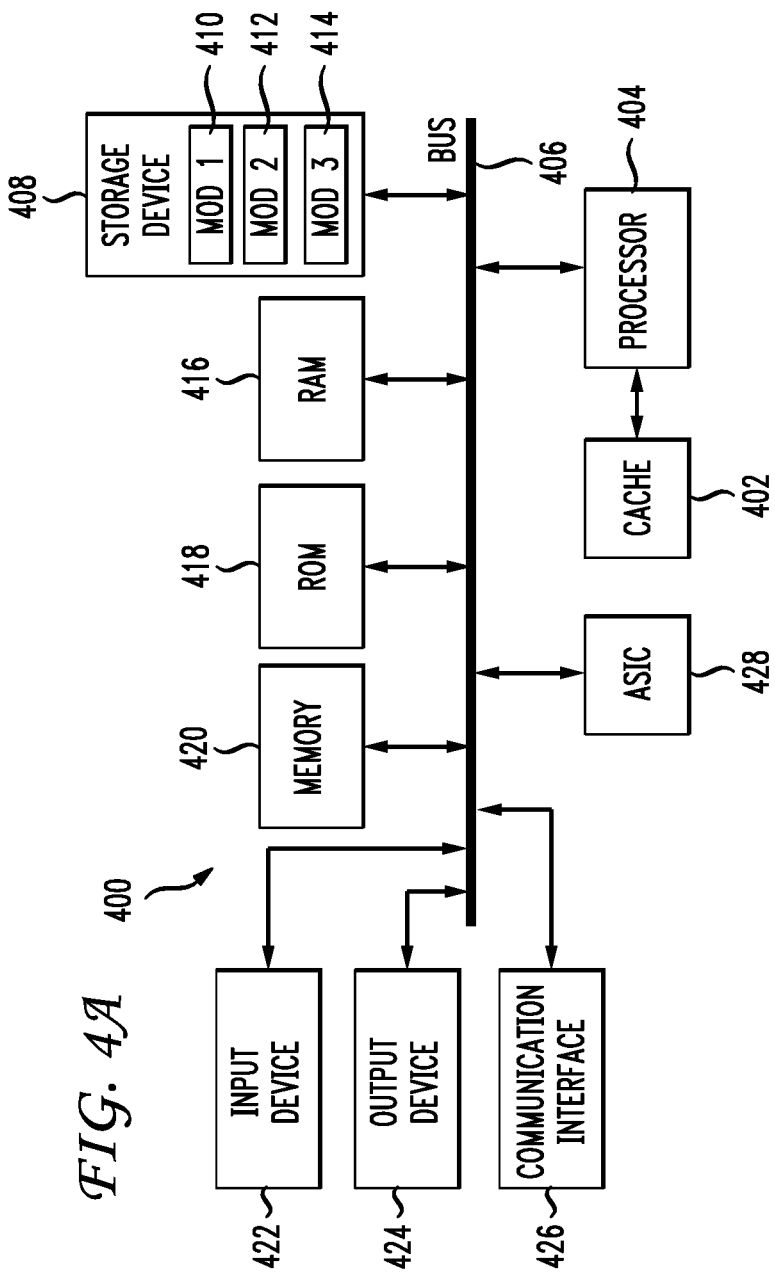
FIGS. 4A and 4B illustrate example system embodiments.
Figure 4B:
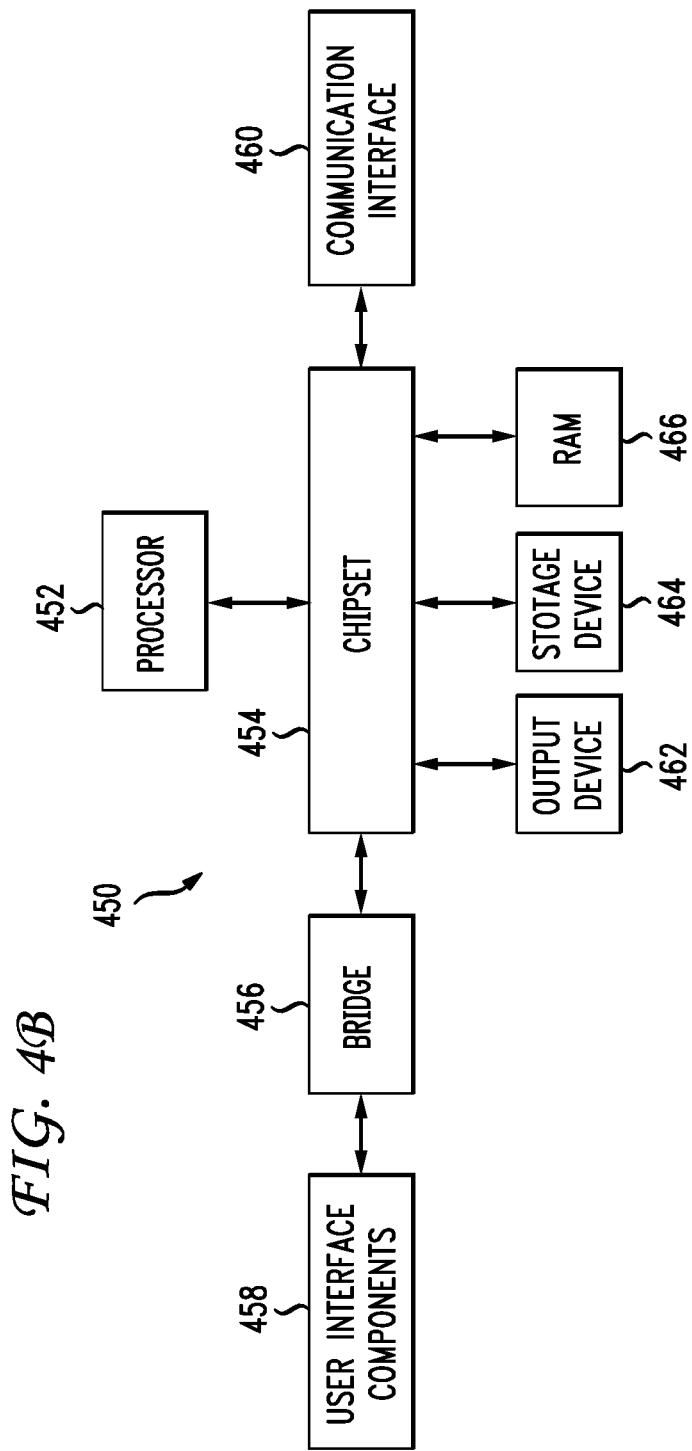

FIG. 4A and FIG. 4B illustrate example system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 406. Exemplary system 400 includes a processing unit (CPU or processor) 404 and a system bus 406 that couples various system components including the system memory 420, such as read only memory (ROM) 418 and random access memory (RAM) 416, to the processor 404. The system 400 can include a cache of high-speed memory connected directly with, in close proximity to, or integrated as part of the processor 404. The system 400 can copy data from the memory 420 and/or the storage device 408 to the cache 402 for quick access by the processor 404. In this way, the cache can provide a performance boost that avoids processor 404 delays while waiting for data. These and other modules can control or be configured to control the processor 404 to perform various actions. Other system memory 420 may be available for use as well. The memory 420 can include multiple different types of memory with different performance characteristics. The processor 404 can include any general purpose processor and a hardware module or software module, such as module 1 410, module 2 412, and module 3 414 stored in storage device 408, configured to control the processor 404 as well as a special-purpose processor where software instructions are incorporated into the actual processor design. The processor 404 may essentially be a completely self-contained computing system, containing multiple cores or processors, a bus, memory controller, cache, etc. A multi-core processor may be symmetric or asymmetric.

To enable user interaction with the computing device 400, an input device 422 can represent any number of input mechanisms, such as a microphone for speech, a touch-sensitive screen for gesture or graphical input, keyboard, mouse, motion input, speech and so forth. An output device 424 can also be one or more of a number of output mechanisms known to those of skill in the art. In some instances, multimodal systems can enable a user to provide multiple types of input to communicate with the computing device 400. The communications interface 426 can generally govern and manage the user input and system output. There is no restriction on operating on any particular hardware arrangement and therefore the basic features here may easily be substituted for improved hardware or firmware arrangements as they are developed.

Storage device 408 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 416, read only memory (ROM) 418, and hybrids thereof.

The storage device 408 can include software modules 410, 412, 414 for controlling the processor 404. Other hardware or software modules are contemplated. The storage device 408 can be connected to the system bus 406. In one aspect, a hardware module that performs a particular function can include the software component stored in a computer-readable medium in connection with the necessary hardware components, such as the processor 404, bus 406, output device (e.g., display) 424, and so forth, to carry out the function.

The system 400 can also include an application specific integrated circuit or ASIC 428. The ASIC 428 can communicate with other components in the system 400 (e.g., components 402-426) via the bus 406. The ASIC 428 can be an integrated circuit customized for a particular use, such as routing operations, including forwarding operations.

FIG. 4B illustrates an example computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 452, representative of any number of physically and/or logically distinct resources capable of executing software, firmware, and hardware configured to perform identified computations. Processor 452 can communicate with a chipset 454 that can control input to and output from processor 452. In this example, chipset 454 outputs information to output device 462, such as a display, and can read and write information to storage device 464, which can include magnetic media, and solid state media, for example. Chipset 454 can also read data from and write data to RAM 466. A bridge 456 for interfacing with a variety of user interface components 458 can be provided for interfacing with chipset 454. Such user interface components 458 can include a keyboard, a microphone, touch detection and processing circuitry, a pointing device, such as a mouse, and so on. In general, inputs to system 450 can come from any of a variety of sources, machine generated and/or human generated.

Chipset 454 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 452 analyzing data stored in storage 464 or 466. Further, the machine can receive inputs from a user via user interface components 458 and execute appropriate functions, such as browsing functions by interpreting these inputs using processor 452.

It can be appreciated that example systems 400 and 450 can have more than one processor or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Moreover, claim language reciting "at least one of" a set indicates that one member of the set or multiple members of the set satisfy the claim. For example, claim language reciting "at least one of A and B" can include A only, B only, or A and B.

What is claimed is:

1. A method comprising:
  configuring system software of a network device to run inside of a first software container at the network device;
  identifying a remote server for hosting the first software container during an update event;
  exporting, from the network device to the remote server, a state of software processes associated with the first software container, the state being exported for a second software container at the remote server, the second software container being based on the state and the first software container, wherein the second software container comprises an updated version of the first software container;
  generating, at the network device, a third software container configured to tunnel traffic associated with the first software container to the second software container, the third software container comprising a lightweight container having a lower memory footprint than the first software container;
  performing a first switchover operation between the first software container and the third software container, the first switchover operation comprising enabling the third software container to tunnel, from the network device to the second container on the remote server, traffic associated with the first software container;
  generating a fourth software container at the network device based on a snapshot of the second software container on the remote server; and
  performing a second switchover operation between the third software container and the fourth software container, the second switchover operation comprising:
    enabling the fourth software container to handle traffic associated with the first software container; and
    disabling the third software container on the network device.

2. The method of claim 1, wherein the first switchover operation enables the third software container to tunnel traffic associated with the first software container to the second software container during the update event, the update event comprising a software update to the first software container.

3. The method of claim 1, further comprising configuring, at the network device, addressing information of the remote server, the addressing information comprising at least one of dynamic naming system (DNS) information or a network name.

4. The method of claim 1, wherein the third software container is configured to:
  manage hardware resources at the network device; and
  encapsulate and decapsulate control plane traffic from the network device to the second container on the remote server.

5. The method of claim 1, wherein the first switchover operation further comprises disabling the first software container on the network device, and wherein the second switchover operation comprises disabling the third software container on the network device.

6. The method of claim 1, further comprising:
  performing a line card container upgrade at the network device for instructing the line card associated with the network device to route traffic associated with the first software container to the fourth software container; and
  disabling the second software container on the remote server.

7. The method of claim 1, further comprising:
  receiving, by the third software container during the update event, traffic associated with the first software container; and
  tunneling the traffic to the second software container at the remote server.

8. A non-transitory computer-readable storage medium having stored therein instructions which, when executed by a processor, cause the processor to perform operations comprising:
  configuring system software of a network device to run inside of a first software container at the network device;
  identifying a remote server for hosting the first software container during an update event;
  exporting, from the network device to the remote server, a state of software processes associated with the first software container, the state being exported for a second software container at the remote server, the second software container being based on the state and the first software container, wherein the second software container comprises an updated version of the first software container;
  generating, at the network device, a third software container configured to tunnel traffic associated with the first software container to the second software container, the third software container comprising a lightweight container having a lower memory footprint than the first software container;
  performing a first switchover operation between the first software container and the third software container, the first switchover operation comprising enabling the third software container to tunnel, from the network device to the second container on the remote server, traffic associated with the first software container;
  generating a fourth software container at the network device based on a snapshot of the second software container on the remote server; and
  performing a second switchover operation between the third software container and the fourth software container, the second switchover operation comprising:
    enabling the fourth software container to handle traffic associated with the first software container; and
    disabling the third software container on the network device.

9. The non-transitory computer-readable storage medium of claim 8, wherein the first switchover operation enables the third software container to tunnel traffic associated with the first software container to the second software container during the update event, the update event comprising a software update to the first software container.

10. The non-transitory computer-readable storage medium of claim 8, wherein the network device comprises a switch and the first software container is based on a network operating system of the switch, and wherein the second software container is based on an updated version of the network operating system of the switch.

11. The non-transitory computer-readable storage medium of claim 8, storing additional instructions which, when executed by the one or more processors, cause the one or more processors to perform operations further comprising:
  prior to the exporting step, verifying a reachability of the remote server by sending one or more probes to the remote server.

12. The non-transitory computer-readable storage medium of claim 11, storing additional instructions which, when executed by the one or more processors, cause the one or more processors to perform operations further comprising:
- prior to the exporting step, adding a network name of the remote server to a network setting associated with the first software container.

13. The non-transitory computer-readable storage medium of claim 11, wherein the third software container is configured to:
- manage hardware resources at the network device; and
- encapsulate and decapsulate control plane traffic from the network device to the second container on the remote server.

14. The non-transitory computer-readable storage medium of claim 11, storing additional instructions which, when executed by the one or more processors, cause the one or more processors to perform operations further comprising:
- receiving, by the third software container during the update event, traffic associated with the first software container; and
- tunneling the traffic to the second software container at the remote server.

15. A system comprising:
one or more processors; and
one or more computer-readable storage devices having stored therein instructions which, when executed by the one or more processors, cause the one or more processors to:
- configure system software to run inside of a first software container at the system;
- identify a remote server for hosting the first software container during an update event;
- export, to the remote server, a state of software processes associated with the first software container, the state being exported for a second software container at the remote server, the second software container being based on the state and the first software container, wherein the second software container comprises an updated version of the first software container;
- generate, at the system, a third software container configured to tunnel traffic associated with the first software container to the second software container, the third software container comprising a lightweight container having a lower memory footprint than the first software container;
- perform a first switchover operation between the first software container and the third software container, the first switchover operation comprising enabling the third software container to tunnel, to the second container on the remote server, traffic associated with the first software container;
- generate a fourth software container at the system based on a snapshot of the second software container on the remote server; and
- perform a second switchover operation between the third software container and the fourth software container, the second switchover operation comprising:
  - enabling the fourth software container to handle traffic associated with the first software container; and
  - disabling the third software container on the system.

16. The system of claim 15, wherein the first switchover operation enables the third software container to tunnel traffic associated with the first software container to the second software container during the update event, the update event comprising a software update to the first software container.

17. The system of claim 15, wherein the third software container is configured to:
- manage hardware resources at the system; and
- encapsulate and decapsulate control plane traffic from the system to the second container on the remote server.

18. The system of claim 15, wherein the first switchover operation further comprises disabling the first software container on the system, and wherein the second switchover operation comprises disabling the third software container on the system.

19. The system of claim 15, the one or more computer-readable storage devices storing instructions which, when executed by the one or more processors, cause the one or more processors to:
- perform a line card container upgrade for instructing the line card to route traffic associated with the first software container to the fourth software container; and
- disable the second software container on the remote server.

* * * * *